US009859841B2

(12) United States Patent
Lv et al.

(10) Patent No.: US 9,859,841 B2
(45) Date of Patent: Jan. 2, 2018

(54) PHOTOVOLTAIC JUNCTION BOX WITH HEAT CONDUCTION ANGLE BETWEEN 180°-360°

(71) Applicant: Tyco Electronics (Shanghai) Co. Ltd., Shanghai (CN)

(72) Inventors: Wenbo Lv, Shanghai (CN); Cui Li, Shanghai (CN); Yuan Zhong, Shanghai (CN); Xiang Xu, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/240,318

(22) Filed: Aug. 18, 2016

(65) Prior Publication Data

US 2017/0063298 A1    Mar. 2, 2017

(30) Foreign Application Priority Data

Aug. 26, 2015    (CN) .................... 2015 2 0650940 U

(51) Int. Cl.
*H02S 40/34* (2014.01)
*H02G 3/08* (2006.01)
*H02G 3/03* (2006.01)

(52) U.S. Cl.
CPC ............. *H02S 40/345* (2014.12); *H02G 3/03* (2013.01); *H02G 3/081* (2013.01); *H02S 40/34* (2014.12)

(58) Field of Classification Search
None
See application file for complete search history.

(56) References Cited

U.S. PATENT DOCUMENTS

| 8,128,439 | B2 | 3/2012 | Feldmeier et al. | |
|---|---|---|---|---|
| 2004/0177987 | A1* | 9/2004 | Yoshikawa | H01R 9/2425 174/59 |
| 2005/0054219 | A1* | 3/2005 | Werner | H02S 40/34 439/76.1 |
| 2005/0197001 | A1* | 9/2005 | Higashikozono | H01R 9/16 439/485 |
| 2005/0224110 | A1* | 10/2005 | Yoshikawa | H01L 31/02008 136/251 |
| 2005/0236031 | A1* | 10/2005 | Higashikozono | H02S 40/345 136/251 |
| 2009/0086444 | A1* | 4/2009 | Yoshikawa | H02S 40/34 361/752 |

(Continued)

*Primary Examiner* — Dimary Lopez Cruz
*Assistant Examiner* — Muhammed Azam
(74) *Attorney, Agent, or Firm* — Barley Snyder

(57) ABSTRACT

A photovoltaic junction box is provided, including: a box body; a plurality of conduction terminals received in the box body; and at least one surface-mounted diode mounted on the plurality of conduction terminals. Each surface-mounted diode includes a flat body, at least one anode pin extending outwardly from an edge of the flat body, and a cathode pad located on a bottom of the flat body. The cathode pad of at least one surface-mounted diode mounted on a surface of the conduction terminal has a heat conduction angle γ more than 180 degrees and less than 360 degrees. Since the heat conduction angle is more than 180 degrees, the heat produced by the diode may be rapidly transferred to the conduction terminal in time to avoid deterioration or damage to the diode, improving the heat dissipation rate, and improving the current carrying capacity of the photovoltaic junction box.

20 Claims, 4 Drawing Sheets

(56) References Cited

U.S. PATENT DOCUMENTS

| | | | |
|---|---|---|---|
| 2010/0216336 A1* | 8/2010 | Quiter | H01R 4/4809 439/567 |
| 2010/0263714 A1* | 10/2010 | Lauermann | H02S 40/34 136/251 |
| 2012/0075825 A1* | 3/2012 | Yamazaki | H02S 40/34 361/809 |
| 2012/0174970 A1* | 7/2012 | Yoshikawa | H02S 40/34 136/252 |
| 2012/0224339 A1* | 9/2012 | Yoshikawa | H02S 40/34 361/752 |
| 2012/0314356 A1* | 12/2012 | Yoshikawa | H02S 40/34 361/679.01 |

* cited by examiner

PHOTOVOLTAIC JUNCTION BOX WITH HEAT CONDUCTION ANGLE BETWEEN 180°-360°

CROSS-REFERENCE TO RELATED APPLICATION

This application claims the benefit of the filing date under 35 U.S.C. §119(a)-(d) of Chinese Patent Application No. 201520650940.5 filed on Aug. 26, 2015.

FIELD OF THE INVENTION

The present disclosure relates to a photovoltaic junction box to be mounted on a solar panel.

BACKGROUND

A solar panel (or solar cell panel) is generally adapted to collect solar energy and transform the collected solar energy to electrical energy. When the solar panel is sheltered by a cloud or some leaves and the like to produce a shadow on the solar panel, it will cause a heat plate effect on the sheltered cell pieces and thus result in over-burning of the cell pieces. A diode in the junction box acts as a bypass when producing the heat plate effect so as to prevent the cell pieces from being over-burnt.

In the prior art, the photovoltaic junction box is directly mounted on a solar panel and is electrically connected with a bus bar of the solar panel. The photovoltaic junction box is provided with a plurality of conductive terminals and a plurality of diodes electrically connected to the conduction terminals, wherein an anode and a cathode of each diode are soldered on a pair of adjacent conduction terminals, respectively. In operation, the diode will produce heat, and then the produced heat will be transferred to the conduction terminals.

In the prior art, opposite edges of adjacent conduction terminals exhibit lines parallel to each other, and the anode and the cathode of the diode are soldered on areas in the vicinity of the edges of the adjacent conduction terminals, respectively. With regard to the current design of the conduction terminals, the diode welded on the conduction terminal has a heat conduction angle, which can only be equal or less than 180 degrees. In this way, the heat conduction efficiency of the conduction terminal will be reduced, and the heat produced by the diodes cannot dissipate to the conduction terminals in time to avoid deterioration or damage to the diode, deteriorating or damaging the diode over time and thus limiting a current-carrying capacity of the solar junction box.

SUMMARY

The object of the present disclosure is to solve at least one aspect of the above mentioned technical problems or other technical problems of the prior art.

One object of the present disclosure is to provide a photovoltaic junction box, which may increase the heat conduction angle of a diode soldered on the conduction terminal, such that the heat produced by the diode may be rapidly transferred to the conduction terminal in time to avoid deterioration or damage to the diode, improving the heat dissipation rate, and improving the current carrying capacity and work stability of the photovoltaic junction box.

According to one aspect of the present disclosure adapted to be mounted on a solar panel, comprising: a box body; a plurality of conduction terminals received in the box body; and at least one surface-mounted diode mounted on the plurality of conduction terminals by means of Surface Mount Technology (SMT). Each surface-mounted diode comprises a flat body, at least one anode pin extending outwardly from an edge of the flat body, and a cathode pad located on a bottom of the flat body. The cathode pad of at least one surface-mounted diode mounted on a surface of the conduction terminal has a heat conduction angle $\gamma$ more than 180 degrees and less than 360 degrees.

According to an exemplary embodiment of the present disclosure, an edge of at least one of the plurality of conduction terminals is formed with a notch recessed inward therefrom, and the notch has a straight bottom edge, and a first lateral edge and a second lateral edge located on either side of the bottom edge. A first angle $\alpha$ is defined between the first lateral edge and the bottom edge, and a second angle $\beta$ is defined between the second lateral edge and the bottom edge. The cathode pad of the at least one surface-mounted diode is surface-mounted on the conduction terminal with the notch, and a front edge of the cathode pad is substantially aligned with the bottom edge of the notch so as to increase the heat conduction angle $\gamma$ of the cathode pad, wherein the heat conduction angle $\gamma$ is calculated by the following expression:

$$\gamma = 540 \text{ degrees} - \alpha - \beta.$$

According to another exemplary embodiment of the present disclosure, the first angle $\alpha$ and the second angle $\beta$ are more than 0 degree and less than 180 degrees.

According to another exemplary embodiment of the present disclosure, an edge of at least one of the plurality of conduction terminals is formed with a projection projecting outward therefrom, and the projection is projected into the notch of a corresponding conduction terminal.

According to another exemplary embodiment of the present disclosure, the edge of the projection and the edge of the notch corresponding to the projection are arranged parallel to each other and separated from each other.

According to another exemplary embodiment of the present disclosure, the anode pins of the at least one surface-mounted diode are surface-mounted on the projection of a corresponding conduction terminal.

According to another exemplary embodiment of the present disclosure, the first angle $\alpha$ is equal to, less than or more than the second angle $\beta$.

According to another exemplary embodiment of the present disclosure, the notch is trapezoid-shaped or sector-shaped.

According to another exemplary embodiment of the present disclosure, the heat conduction angle $\gamma$ is more than 200 degrees and less than 360 degrees.

According to another exemplary embodiment of the present disclosure, the heat conduction angle $\gamma$ is more than 270 degrees and less than 360 degrees.

According to another exemplary embodiment of the present disclosure, a length of the bottom edge of the notch is substantially equal to that of the front edge of the flat body of the surface-mounted diode.

According to another exemplary embodiment of the present disclosure, each of conduction terminals is formed with a plurality of positioning holes, and a bottom wall of an internal portion of the box body is formed with a plurality of positioning stubs engaged with the positioning holes, respectively, so as to position and fix the conduction terminals.

According to another exemplary embodiment of the present disclosure, bus bars 401 provided on the solar plane are introduced into the box body and soldered to the conduction terminals, respectively.

According to another exemplary embodiment of the present disclosure, the photovoltaic junction box comprises four conduction terminals, and three surface-mounted diodes, wherein one diode is surface-mounted on two adjacent conduction terminals.

According to another exemplary embodiment of the present disclosure, the four conduction terminals comprises a first conduction terminal, a second conduction terminal, a third conduction terminal and a fourth conduction terminal arranged sequentially in the lengthwise direction of the box body.

According to another exemplary embodiment of the present disclosure, the photovoltaic junction box further comprises: a first wire, one end of which being introduced into the box body from one end of the box body and electrically connected to the first conduction terminal; and a second wire, one end of which being introduced into the box body from the other end of the box body and electrically connected to the fourth conduction terminal.

According to another exemplary embodiment of the present disclosure, a conductor at one end of the first wire is soldered or crimped onto the first conduction terminal, and a conductor at one end of the second wire is soldered or crimped onto the fourth conduction terminal.

According to another exemplary embodiment of the present disclosure, the third conduction terminal is formed with the notch, and the second conduction terminal is formed with the projection.

According to another exemplary embodiment of the present disclosure, a surface area of the third conduction terminal is larger than that of other conduction terminals.

According to another exemplary embodiment of the present disclosure, the surface area of the third conduction terminal is larger than that of the second conduction terminal; the surface area of the second conduction terminal is larger than that of the fourth conduction terminal; and the surface area of the fourth conduction terminal is larger than that of the first conduction terminal.

In the various exemplary embodiments of the present disclosure, an edge of the conduction terminal is formed with a notch, and the cathode pad of the diode is soldered at the area in the vicinity of the bottom edge of the notch of the conduction terminal such that the heat conduction angle of the diode is increased, and the heat produced by the diode may be rapidly transferred to the conduction terminal in time to avoid deterioration or damage to the diode, improving the heat dissipation rate, and improving the current carrying capacity and work stability of the photovoltaic junction box.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF THE EMBODIMENT(S)

Figure 1:
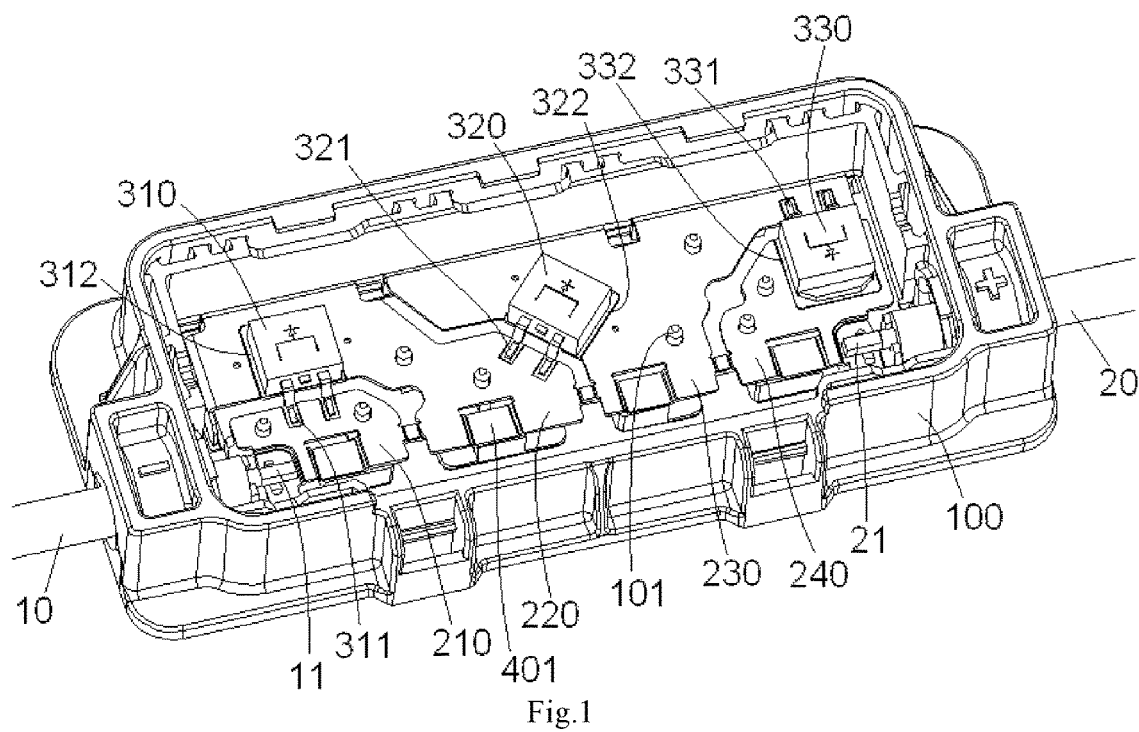
FIG. 1 shows a schematic perspective view of a photovoltaic junction box according to an exemplary embodiment of the present disclosure.

Technical solutions of the present disclosure will be described hereinafter in detail with reference to the attached drawings and in combination with the embodiments, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Furthermore, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general technical concept of the invention, there is provided a photovoltaic junction box adapted to be mounted on a solar panel, comprising: a box body; a plurality of conduction terminals received in the box body; and at least one surface-mounted diode mounted on the plurality of conduction terminals by means of Surface Mount Technology. Each surface-mounted diode comprises a flat body, at least one anode pin extending outwardly from an edge of the flat body, and a cathode pad located on a bottom of the flat body. The cathode pad of at least one surface-mounted diode surface-mounted on a surface of the conduction terminal has a heat conduction angle γ more than 180 degrees and less than 360 degrees.

FIG. 1 shows a schematic perspective view of a photovoltaic junction box according to an exemplary embodiment of the present disclosure.

In an exemplary embodiment of the present disclosure, there is provided a photovoltaic junction box adapted to be mounted on a solar panel. As illustrated in FIG. 1, the photovoltaic junction box mainly comprises: a box body 100, a plurality of conduction terminals 210, 220, 230, and 240, and at least one surface-mounted diode 310, 320, and 330.

As illustrated in FIG. 1, in the illustrated embodiment, the conduction terminals 210, 220, 230, and 240 are received in the box body 100, and the surface-mounted diodes 310, 320, and 330 are mounted on the conduction terminals 210, 220, 230, and 240 by means of Surface Mount Technology.

In an exemplary embodiment of the present disclosure, as illustrated in FIG. 1, each surface-mounted diode 310, 320 or 330 comprises a flat body, at least one anode pin 311, 321 or 331 extending outwardly from an edge of the flat body, and a cathode pad 312, 322 or 332 located on a bottom of the flat body.

In the illustrated embodiment, as illustrated in FIG. 1, the photovoltaic junction box comprises four conduction terminals 210, 220, 230, and 240, and three surface-mounted diodes 310, 320, and 330, wherein one diode 310, 320, or 330 is surface-mounted on two adjacent conduction terminals 210, 220; 220, 230; or 230, 240.

Figure 2:
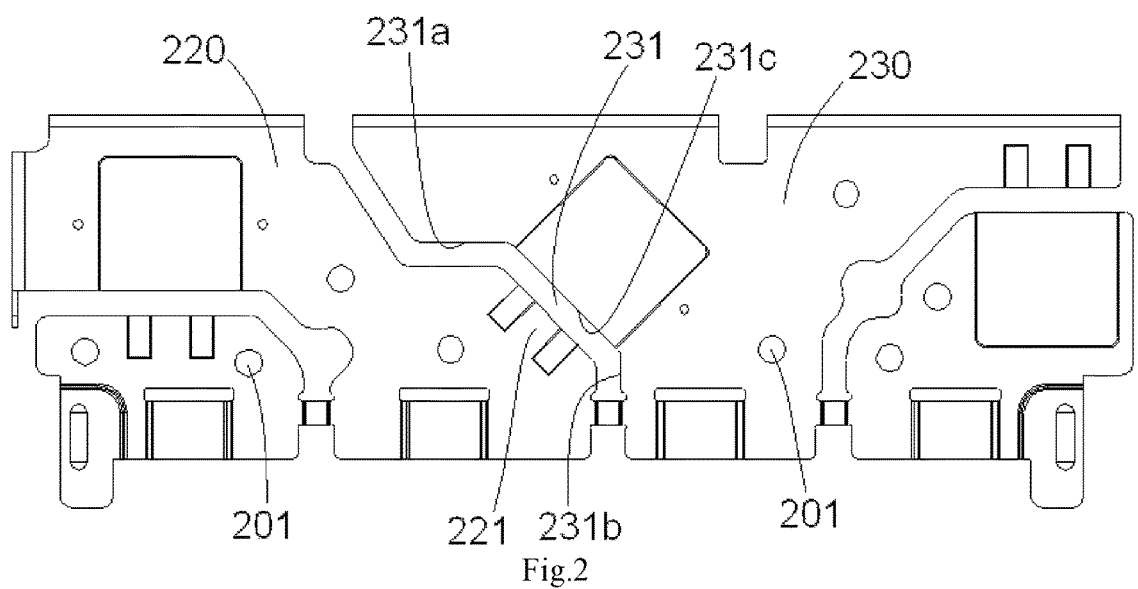
FIG. 2 shows a schematic view of four conduction terminals in the photovoltaic junction box as shown in FIG. 1.

FIG. 2 shows a schematic view of four conduction terminals 210, 220, 230, and 240 in the photovoltaic junction box as shown in FIG. 1.

As illustrated in FIGS. 1 and 2, in the illustrated embodiment, four conduction terminals 210, 220, 230, and 240 are arranged in a lengthwise direction of the box body 100. For the sake of easy explanation, these four conduction terminals 210, 220, 230, and 240 comprise a first conduction terminal 210, a second conduction terminal 220, a third conduction terminal 230 and a fourth conduction terminal 240 arranged sequentially from a left side to a right side in FIG. 1. These three surface-mounted diodes 310, 320, and 330 comprise a first surface-mounted diode 310, a second surface-mounted diode 320 and a third surface-mounted diode 330 arranged sequentially from the left side to the right side in FIG. 1.

As shown in FIG. 1, in the illustrated embodiment, the anode pins 311 and the cathode pad 312 of the first surface-mounted diode 310 are soldered on the first conduction terminal 210 and the second conduction terminal 220 by means of Surface Mount Technology, respectively; the anode pins 321 and the cathode pad 322 of the second surface-mounted diode 320 are soldered on the second conduction terminal 220 and the third conduction terminal 230, respectively; and the anode pins 331 and the cathode pad 332 of the third surface-mounted diode 330 are soldered on the third conduction terminal 230 and the fourth conduction terminal 240, respectively.

Continuously referring to FIG. 1, in the illustrated embodiment, the photovoltaic junction box further comprises a first wire 10 and a second wire 20. One end of the first wire 10 is introduced into the box body 100 from one end of the box body 100, and a conductor 11 of the first wire 10 is electrically connected to the first conduction terminal 210. To be specific, the conductor 11 of the first wire 10 may be soldered or crimped onto the first conduction terminal 210. One end of the second wire 20 is introduced into the box body 100 from the other end of the box body 100, and a conductor 21 of the second wire 20 is electrically connected to the fourth conduction terminal 240. To be specific, the conductor 21 of the second wire 20 may be soldered or crimped onto the fourth conduction terminal 240.

Please be noted that the heat produced by the diodes in operation is mainly concentrated on the cathode pad, and a little heat exists on the anode pin. Therefore, it is necessary to improve thermal conductivity of the conduction terminal, on which the cathode pad is soldered.

In the illustrated embodiment, as shown in FIG. 1, the first conduction terminal 210 is welded with only the anode pins 311; the second conduction terminal 220 is welded with the anode pins 321 as well as the cathode pad 312; the third conduction terminal 230 is welded with the anode pins 331 as well as the cathode pad 322; and the fourth conduction terminal 240 is welded with only the cathode pad 332. Thus, in the illustrated embodiment, in operation, the heat transmitted to the first conduction terminal 210 is the least; the heat transmitted to the fourth conduction terminal 240 is more than that transmitted to the first conduction terminal 210; and the heat transmitted to the second conduction terminal 220 or the third conduction terminal 230 is more than that transmitted to the fourth conduction terminal 240. Furthermore, since a majority of the third conduction terminal 230 is located at a central area of the box body 100, the heat dissipation performance of the third conduction terminal 230 should be much poorer than that of the second conduction terminal 220. Therefore, the third conduction terminal 230 has a greatest heat dissipation load in these four conduction terminals 210, 220, 230 and 240, and it is thus necessary to improve a thermal conductivity of the third conduction terminal 230.

Figure 3:
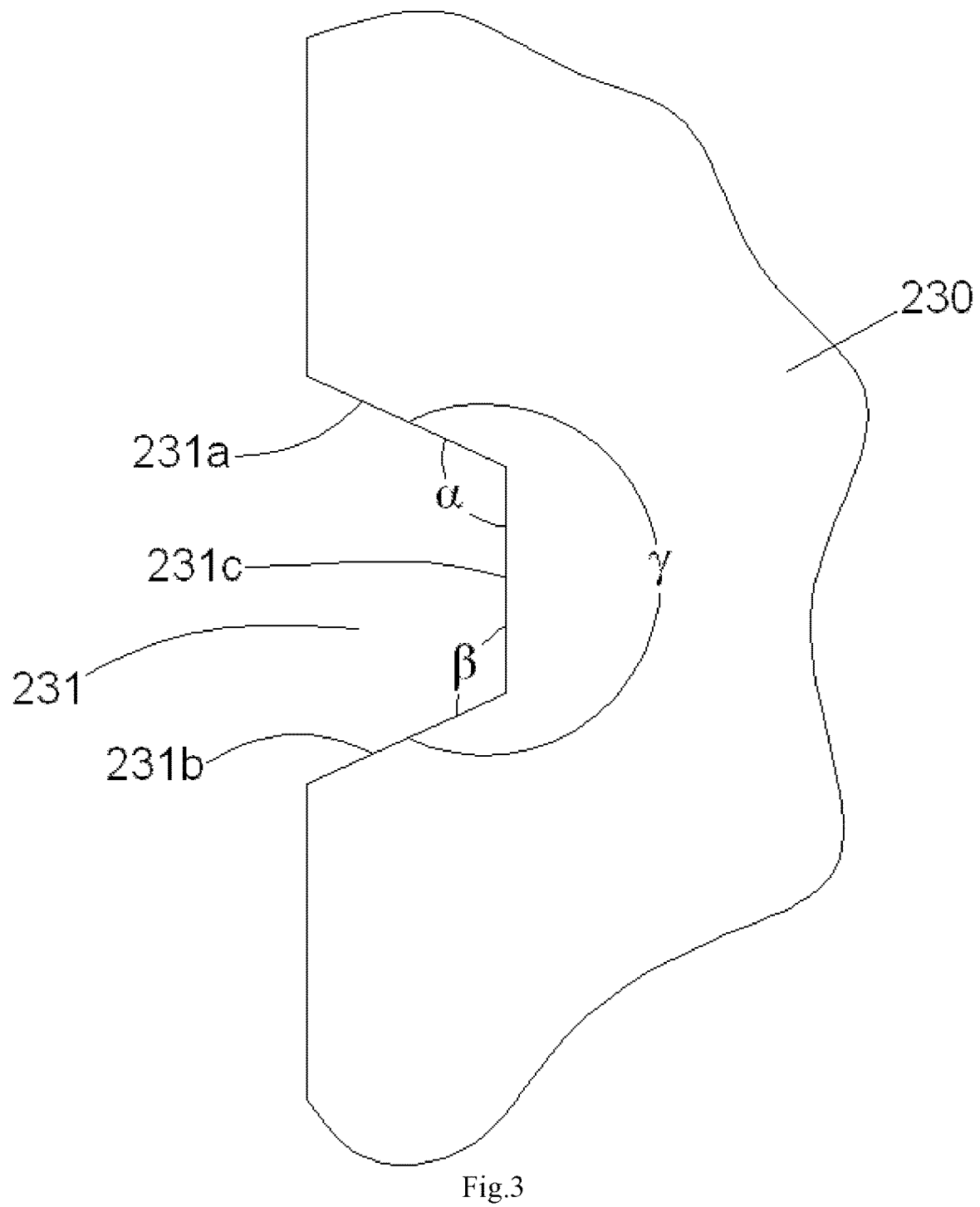
FIG. 3 shows an enlarged view of an edge area of a third conduction terminal opposite to an edge area of a second conduction terminal of those four conduction terminals as shown in FIG. 2.
Figure 4:
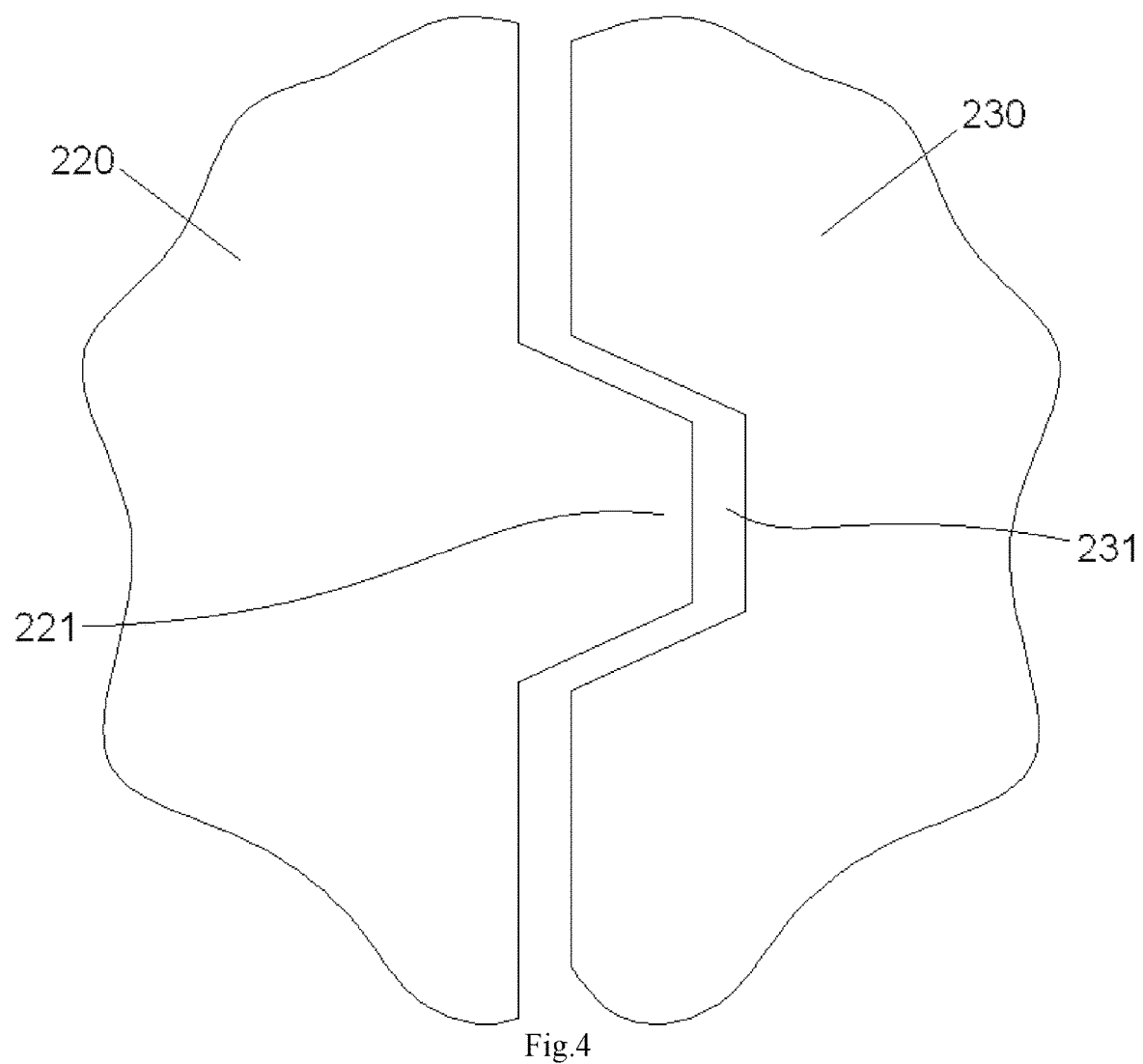
FIG. 4 shows an enlarged view of opposite edge areas of the third conduction terminal and the second conduction terminal of those four conduction terminals as shown in FIG. 2.

FIG. 3 shows an enlarged view of an edge area of the third conduction terminal 230 opposite to an edge area of the second conduction terminal 220 of those four conduction terminals 210, 220, 230 and 240 as shown in FIG. 2; FIG. 4 shows an enlarged view of opposite edge areas of the third conduction terminal 230 and the second conduction terminal 220 of those four conduction terminals 210, 220, 230 and 240 as shown in FIG. 2; and FIG. 5 a schematic view of a surface-mounted diode 320 soldered on opposite edge areas of the third conduction terminal 230 and the second conduction terminal 220 as shown in FIG. 4.

In order to improve a thermal conductivity of the third conduction terminal 230, in an exemplary embodiment of the present disclosure, as shown in FIGS. 2 to 5, an edge of the third conduction terminal 230 facing an edge area of the second conduction terminal 220 is formed with a notch 230 recessed inward therefrom, and the notch 231 has a straight bottom edge 231c, and a first lateral edge 231a and a second lateral edge 231b located on either side of the bottom edge.

Figure 5:
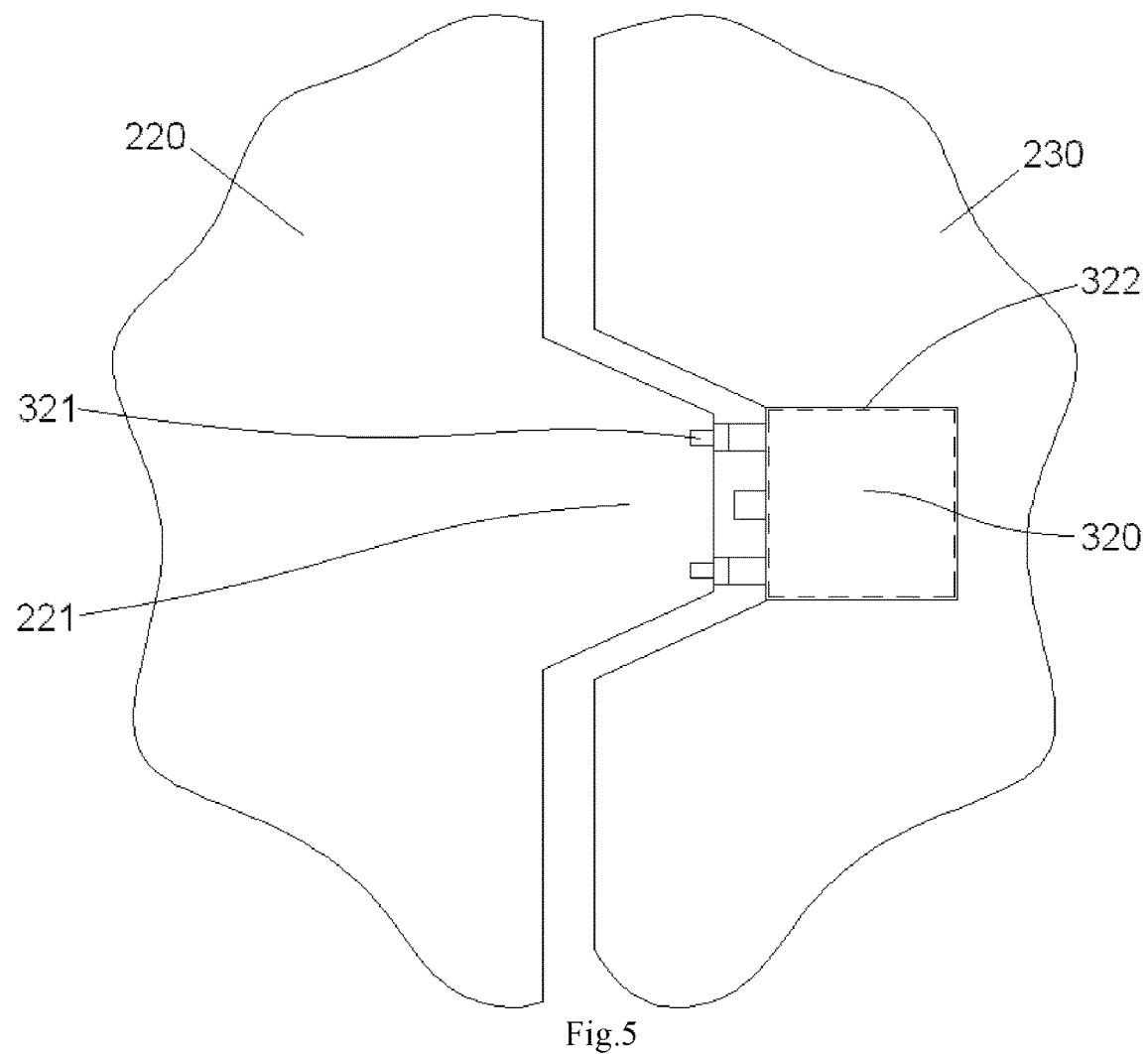
FIG. 5 a schematic view of a surface-mounted diode soldered on opposite edge areas of the third conduction terminal and the second conduction terminal as shown in FIG. 4.

As clearly illustrated in FIG. 3, in the illustrated embodiment, a first angle α is defined between the first lateral edge 231a and the bottom edge 231c, a second angle β is defined between the second lateral edge 231b and the bottom edge 231c, and the first angle α and the second angle β are set more than 0 degree and less than 180 degrees. As illustrated in FIGS. 3 and 5, in the illustrated embodiment, the cathode pad 322 of the second surface-mounted diode 320 is surface-mounted on the third conduction terminal 230 with the notch 231, and a front edge of the cathode pad 322 surface-mounted on the third conduction terminal 230 is substantially aligned with the bottom edge 231c of the notch 231 so as to increase the heat conduction angle γ of the cathode pad 322 surface-mounted on the third conduction terminal 230, where the heat conduction angle γ is calculated by the following expression:

$$\gamma = 540 \text{ degrees} - \alpha - \beta \quad (1)$$

wherein the heat conduction angle γ is set more than 180 degrees and less than 360 degrees.

As illustrated in FIGS. 2 and 4, in the illustrated embodiment, an edge of the second conduction terminal 220 is formed with a projection 221 projecting outward therefrom, and the projection 221 is projected into the notch 231 of the third conduction terminal 230. In the illustrated embodiment, as illustrated in FIGS. 2 and 4, the edge of the projection 221 of the second conduction terminal 220 and the edge of the notch 231 of the third conduction terminal 230 are arranged parallel to each other and separated from each other by a predetermined distance. The anode pins 322 of the second surface-mounted diode 320 are surface-mounted on the projection 221 of the second conduction terminal 220.

In the illustrated embodiment, as illustrated in FIG. 3, the first angle α is set equal to the second angle β. However, the present disclosure is not limited to the illustrated embodiment, and the first angle α may be set less than or more than the second angle β.

In the illustrated embodiment, as shown in FIG. 3, the notch 231 of the third conduction terminal 230 is formed as trapezoid-shaped or sector-shaped. Accordingly, as illustrated in FIG. 4, the projection 221 of the second conduction terminal 220 is formed as trapezoid-shaped or sector-shaped, which is mated with the trapezoid-shaped or sector-shaped of the notch 231 of the third conduction terminal 230.

In the illustrated embodiment, as shown in FIG. 3, by properly designing the first angle α and the second angle β, the previous-mentioned heat conduction angle γ may be more than 180 degrees and less than 360 degrees, such as, the heat conduction angle γ may be more than 200 degrees and less than 360 degrees, preferably, more than 270 degrees and less than 360 degrees.

In an exemplary embodiment of the present disclosure, as shown in FIGS. 2 to 5, a length of the bottom edge 231c of the notch 231 of the third conduction terminal 230 is substantially equal to that of the front edge of the flat body of the second surface-mounted diode 320.

As shown in FIGS. 1 and 2, in the illustrated embodiment, each of conduction terminals 210, 220, 230, and 240 is formed with a plurality of positioning holes 201, and a bottom wall of an internal portion of the box body 100 is formed with a plurality of positioning stubs 101 engaged with the positioning holes 201, respectively, so as to position and fix the conduction terminals 210, 220, 230, and 240.

As shown in FIGS. 1 and 2, in the illustrated embodiment, bus bars 401 provided on the solar plane (not shown) are introduced into the box body 100 and soldered to the conduction terminals 210, 220, 230, and 240, respectively.

As previously described, since the heat dissipation load of the third conduction terminal 230 is greatest, in order to further improve a heat dissipation efficiency of the third conduction terminal 230, as illustrated in FIGS. 1 and 2, in the illustrated embodiment, a surface area of the third conduction terminal 230 is larger than that of other conduction terminals 210, 220, and 240.

Further, as previously described, the heat dissipation load of the third conduction terminal 230 is larger than that of the second conduction terminal 220; the heat dissipation load of the second conduction terminal 220 is larger than that of the fourth conduction terminal 240; and the heat dissipation load of the fourth conduction terminal 240 is larger than that of the first conduction terminal 210. Therefore, in an exemplary embodiment of the present disclosure, as shown in FIGS. 1 and 2, in order to optimize the overall heat dissipation efficiency of the photovoltaic junction box, a surface area of the third conduction terminal 230 is larger than that of the second conduction terminal 220; the surface area of the second conduction terminal 220 is larger than that of the fourth conduction terminal 240; and the surface area of the fourth conduction terminal 240 is larger than that of the first conduction terminal 210.

Although the present disclosure has been described with reference to the attached drawings, the embodiments disclosed in the attached drawings are intended to describe the preferred embodiments of the present disclosure exemplarily, but should not be construed as a limitation to the present disclosure.

Although several embodiments of the general concept of the present disclosure have been shown and described, it would be appreciated by those skilled in the art that various changes or modifications may be made in these embodiments without departing from the principles and spirit of the disclosure, the scope of which is defined in the claims and their equivalents.

As used herein, term "comprising" or "having" should be understood as not excluding other elements or steps, and term "a" or "an" should be understood as not excluding plural elements or steps. In addition, any reference numeral in claims should not be understood as the limitation of the scope of the present disclosure.

What is claimed is:

1. A photovoltaic junction box adapted to be mounted on a solar panel, comprising:
   a box body;
   a plurality of conduction terminals received in the box body; and
   at least one surface-mounted diode mounted on the plurality of conduction terminals by means of Surface Mount Technology, wherein each surface-mounted diode comprises a flat body, at least one anode pin extending outwardly from an edge of the flat body, and a cathode pad located on a bottom of the flat body, wherein the cathode pad of at least one surface-mounted diode mounted on a surface of the conduction terminal has a heat conduction angle γ of more than 180 degrees and less than 360 degrees.

2. The photovoltaic junction box according to claim 1, wherein an edge of at least one of the plurality of conduction terminals is formed with a notch recessed inward therefrom, the notch having a straight bottom edge, and a first lateral edge and a second lateral edge located on either side of the bottom edge, a first angle α being defined between the first lateral edge and the bottom edge, and a second angle β being defined between the second lateral edge and the bottom edge, and wherein the cathode pad of the at least one surface-mounted diode is surface-mounted on the conduction terminal with the notch, a front edge of the cathode pad being substantially aligned with the bottom edge of the notch so as to increase the heat conduction angle γ of the cathode pad, wherein the heat conduction angle γ is calculated by the following expression:

$$\gamma = 540 \text{ degrees} - \alpha - \beta \qquad (1).$$

3. The photovoltaic junction box according to claim 2, wherein the first angle α and the second angle β are set more than 0 degree and less than 180 degrees.

4. The photovoltaic junction box according to claim 1, wherein an edge of at least one of the plurality of conduction terminals is formed with a projection projecting outward therefrom, the projection being projected into the notch of a corresponding conduction terminal.

5. The photovoltaic junction box according to claim 4, wherein the edge of the projection and the edge of the notch corresponding to the projection are arranged parallel to each other and separated from each other.

6. The photovoltaic junction box according to claim 4, wherein the anode pins of the at least one surface-mounted diode are surface-mounted on the projection of a corresponding conduction terminal.

7. The photovoltaic junction box according to claim 1, wherein the first angle α is set equal to, less than, or more than the second angle β.

8. The photovoltaic junction box according to claim 1, wherein the notch is formed as trapezoid-shaped or sector-shaped.

9. The photovoltaic junction box according to claim 1, wherein the heat conduction angle γ is set more than 200 degrees and less than 360 degrees.

10. The photovoltaic junction box according to claim 9, wherein the heat conduction angle γ is set more than 270 degrees and less than 360 degrees.

11. The photovoltaic junction box according to claim 1, wherein a length of the bottom edge of the notch is set substantially equal to that of the front edge of the flat body of the surface-mounted diode.

12. The photovoltaic junction box according to claim 1, wherein each conduction terminal is formed with a plurality of positioning holes, and a bottom wall of an internal portion of the box body is formed with a plurality of positioning stubs engaged with the positioning holes, respectively, so as to position and fix the conduction terminals.

13. The photovoltaic junction box according to claim 1, wherein bus bars provided on the solar plane are introduced into the box body and soldered to the conduction terminals, respectively.

14. The photovoltaic junction box according to claim 3, wherein the photovoltaic junction box comprises four conduction terminals, and three surface-mounted diodes, wherein one diode is surface-mounted on two adjacent conduction terminals.

15. The photovoltaic junction box according to claim 14, wherein the four conduction terminals comprises a first conduction terminal, a second conduction terminal, a third conduction terminal and a fourth conduction terminal arranged sequentially in the lengthwise direction of the box body.

16. The photovoltaic junction box according to claim 3, further comprising:
a first wire, one end of which being introduced into the box body from one end of the box body and electrically connected to the first conduction terminal; and
a second wire, one end of which being introduced into the box body from the other end of the box body and electrically connected to the fourth conduction terminal.

17. The photovoltaic junction box according to claim 16, wherein a conductor at one end of the first wire is soldered or crimped onto the first conduction terminal, and a conductor at one end of the second wire is soldered or crimped onto the fourth conduction terminal.

18. The photovoltaic junction box according to claim 17, wherein the third conduction terminal is formed with the notch, and the second conduction terminal is formed with the projection.

19. The photovoltaic junction box according to claim 18, wherein a surface area of the third conduction terminal is larger than that of other conduction terminals.

20. The photovoltaic junction box according to claim 19, wherein the surface area of the third conduction terminal is larger than that of the second conduction terminal; the surface area of the second conduction terminal is larger than that of the fourth conduction terminal; and the surface area of the fourth conduction terminal is larger than that of the first conduction terminal.

* * * * *